US006061309A

United States Patent [19]

Gallo et al.

[11] Patent Number: 6,061,309
[45] Date of Patent: May 9, 2000

[54] METHOD AND APPARATUS FOR MAINTAINING STATES OF AN OPERATOR PANEL AND CONVENIENCE INPUT/ OUTPUT STATION OF A DUAL LIBRARY MANAGER/DUAL ACCESSOR CONTROLLER SYSTEM IN THE EVENT OF A FAILURE TO ONE CONTROLLER

[75] Inventors: Frank David Gallo, Tucson; Kristy Colleen Judd, Pomerene; Anthony Andrew Lambert, Tucson; Michael Pillip McIntosh, Tucson; Fernando Quintana, Tucson, all of Ariz.

[73] Assignee: International Business Machines Corporation, Armonk, N.Y.

[21] Appl. No.: 08/991,902

[22] Filed: Dec. 17, 1997

[51] Int. Cl.⁷ .................................................. G11B 17/22
[52] U.S. Cl. .............................................. 369/34; 714/13
[58] Field of Search ..................... 707/200–206; 369/34; 714/10, 12, 13, 15–24, 48–54

[56] References Cited

U.S. PATENT DOCUMENTS 5,459,848  10/1995  Mase .
5,513,156   4/1996  Hanaoka et al. ........................ 369/34

FOREIGN PATENT DOCUMENTS 3-100960   4/1991  Japan .
4-125206   4/1992  Japan .
4-125844   4/1992  Japan .
4-145518   5/1992  Japan .
4-153106   5/1992  Japan .
5-314733  11/1993  Japan .

OTHER PUBLICATIONS

"Dual Use High Capacity Input/Output Station on an Automated Tape Library", IBM Technical Disclosure Bulletin, 38(05): 113–115 (May 1995).

*Primary Examiner*—John A. Follansbee
*Attorney, Agent, or Firm*—Altera Law Group, LLC

[57] ABSTRACT

A method and apparatus is disclosed for maintaining states of an operator interface, such as an operator panel and convenience input/output station, of a dual library manager/ dual controller system in the event of a failure to one controller during an operation. The invention allows control of the operator panel and convenience input/output station status lights and the states themselves by more than one controller without reinitializing at a default condition by detecting a failure during an operation, switching control to a second accessor controller and establishing a correct state for the operator interface via the second accessor controller. A correct state for a station is established by first establishing a fake empty status for the station and then locking the station, if necessary.

21 Claims, 6 Drawing Sheets

METHOD AND APPARATUS FOR MAINTAINING STATES OF AN OPERATOR PANEL AND CONVENIENCE INPUT/ OUTPUT STATION OF A DUAL LIBRARY MANAGER/DUAL ACCESSOR CONTROLLER SYSTEM IN THE EVENT OF A FAILURE TO ONE CONTROLLER

BACKGROUND OF THE INVENTION

1. Field of the Invention

This invention relates in general to data storage and processing, and more particularly to the management of an operator interface.

2. Description of Related Art

The implementation of new technology in magnetic tape products has meant that the density of data written to tape has increased by orders of magnitude in the last ten or fifteen years. The ability to record high density tapes, e.g., ten gigabytes or more on one physical volume, has led to reducing costs in physical tape hardware as well as in handling and management resources.

However, over the past five years, tape data set stacking products, i.e., software solutions to increase tape utilization, have evolved in response to the customer requirement for more efficient ways to manage the information stored on tape. Often a tape library system is provided in conjunction with a library manger. For example, a virtual tape server (VTS) having a tape library has been proposed to achieve increased capacity. In a VTS, the hardware is transparent to the host and the user. The VTS requires little external management except though the library management element of the tape library into which a VTS is integrated.

In a hierarchical storage systems, such as a VTS, intensively used and frequently accessed data is stored in fast but expensive memory. One example of a fast memory is a direct access storage device (DASD). In contrast, less frequently accessed data is stored in less expensive but slower memory. Examples of slower memory are tape drives and disk drive arrays. The goal of the hierarchy is to obtain moderately priced, high-capacity storage while maintaining high-speed access to the stored information.

In the VTS system, a host data interface, a DASD, and a number of tape devices are provided. When the host writes a logical volume, or a file, to the VTS, the data is stored as a file on the DASD. Although the DASD provides quick access to this data, it will eventually reach full capacity and a backup or secondary storage system will be needed. An IBM 3590 tape cartridge is one example of a tape device that could be used as a backup or secondary storage system.

When the DASD fills to a predetermined threshold, the logical volume data for a selected logical volume, typically the oldest, is removed from the DASD to free space for more logical volumes. The selected DASD file is then appended onto a tape cartridge, or a physical volume, with the original left on the DASD for possible cache hits. When a DASD file has been appended to a tape cartridge and the original remains on the DASD, the file is "premigrated".

When the host reads a logical volume from the VTS, a cache hit occurs if the logical volume currently resides on the DASD. If the logical volume is not on the DASD, the storage manager determines which of the physical tape volumes contains the logical volume. The corresponding physical volume is then mounted on one of the tape devices, and the data for the logical volume is transferred back to the DASD from the tape.

Tape servers may use an engine to move data between the DASD and tape libraries in a virtual tape server (VTS) environment. For example, the IBM Virtual Tape Server (VTS) uses the IBM Adstar Distributed Storage Manager (ADSM) as its engine to move data between the DASD and IBM 3590 tape drives on the VTS. In such a system, the VTS uses the a storage manager client on the DASD, e.g., the ADSM Hierarchical Storage Manager (HSM) client, and a distributed storage manager server attached to the tape drives to provide this function.

A tape library dataserver provides automated tape storage for multiple applications such as mid-range computer facilities, LAN servers and archiving applications. To provide high frequency to data, high storage capacity and high performance must be combined. Therefore, knowing the location of tape cartridges in the tape library is paramount. Typically, the tape cartridges are bar-coded with a serial number or other identifying marking. Thus, an accessor that is equipped with a bar-code reader can access any cartridge in the library. In addition, the accessor can mount any cartridge located in the library on any library drive. The accessor's management feature permits rapid scanning of all tape cartridge bar-codes.

Various functions and indicators are available to the operator of an automated tape library in order to facilitate library operations. These can include lights to indicate various library states or modes or convenience input/output station states on or near the operator panel.

Keeping these status lights and the states themselves synchronized with the actual state of the library is accomplished within the library manager controller, more specifically, the accessor manager controller. In a dual library manager/dual accessor environment, however, there are two accessor manager controllers, one of which is in control of the operator panel status. In the event of an accessor failure, the other accessor manger may take over the accessor operation including the state of the operator panel. However, by switching to the second accessor controller, the states of the library may not be maintained.

It can be seen that there is a need for a method and apparatus that allows control of the operator panel and convenience input/output station status lights by more than one accessor controller.

It can be seen that there is a need for a method and apparatus that allows a second accessor controller to maintain the states of the operator panel and convenience input/ output station without reinitializing at a default condition.

SUMMARY OF THE INVENTION

To overcome the limitations in the prior art described above, and to overcome other limitations that will become apparent upon reading and understanding the present specification, the present invention discloses a method and apparatus for maintaining states of an operator interface of a dual library manager/dual accessor controller system in the event of a failure to one accessor controller.

The present invention solves the above-described problems by providing a method and apparatus that allows control of the operator interface status lights and the states themselves by more than one accessor controller without reinitializing at a default condition.

A method in accordance with the principles of the present invention includes the steps of detecting a failure of the first accessor during an operation, switching control to a second accessor controller, and establishing a correct state for the operator interface via the second accessor controller.

Other embodiments of a system in accordance with the principles of the invention may include alternative or optional additional aspects. One such aspect of the present invention is that the step of detecting a failure further comprises the steps of locking an input/output station, moving a tape to the station using a first accessor, unlocking the station, and detecting the failure of the first accessor.

Another aspect of the present invention is that the step of establishing a correct state for the operator interface further comprises the steps of establishing a fake empty status for a station and locking the station.

Another aspect of the present invention is that the step of detecting the failure further comprises the step of exhibiting an input state for a station.

Another aspect of the present invention is that the step of establishing a correct state for an operator interface further comprises the steps of establishing a fake empty status for a station after the failure of the first accessor to cause the station to exhibit an available state.

Another aspect of the present invention is that the step of detecting the failure further comprises the steps of monitoring the status of a station and recognizing the correct state of the station when the failure occurs.

Another aspect of the present invention is that the step of establishing a correct state for the operator interface further comprises the steps of establishing a fake empty status of a station after the failure of the first accessor and locking the station to bring the station to the correct state.

The invention also is a library manager system that includes an operator panel for displaying a status indication of a library system, a first accessor controller for controlling a first accessor for moving data storage tapes between storage slots, input/output stations, and tape drives, a second accessor controller for controlling a second accessor for moving data storage tapes between storage slots, input/output stations, and tape drives, at least one library manager for controlling the first and second accessor controllers. The at least one library manager detects a failure of the first accessor during an operation and switches control to the second accessor controller, wherein the second accessor controller takes control of the status indication of the library system by establishing a correct state for a station.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus that allows control of status lights and the states of an operator interface by more than one accessor controller without reinitializing at a default condition. The operator interface may include the operator panel and/or convenience input/output station.

Figure 1:
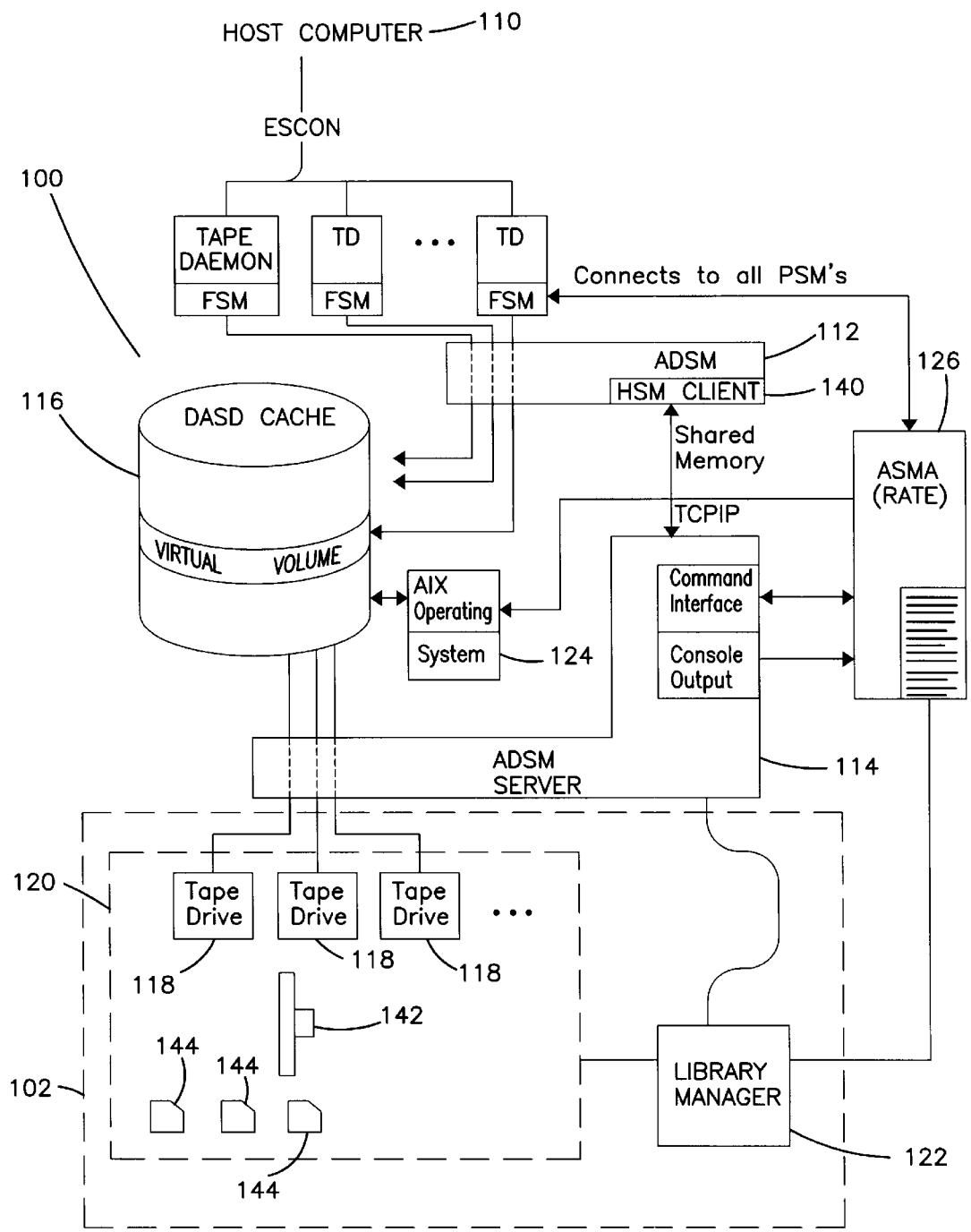
FIG. 1 illustrates a virtual tape server system having a tape library dataserver according to the present invention.

FIG. 1 illustrates a virtual tape server system 100 which may include a tape library dataserver 102 according to the present invention. Those skilled in the art will recognize that the invention is not meant to be limited to a virtual tape server environment, but may be utilized in any dual library manager/dual controller system in the event of a failure to one controller.

The virtual tape server 100 includes a host computer 110, a distributed storage manager 112, an distributed storage manager server 114, and DASD cache 116. The tape library data server 102 includes a plurality of tape drives 118 forming an automated library 120 and a library manager 122. The virtual tape server 100 also includes an operating system 124 and an automatic storage manager administrator 126 (BATE).

In the VTS 100, intensively used and frequently accessed data is stored in fast but expensive memory, such as direct access storage devices (DASD) 116. In contrast, less frequently accessed data is stored in less expensive but slower memory, such as tape drives 118.

A VTS 100 uses an engine 112 to move data between the DASD 116 and tape drives 118. For example, the IBM Virtual Tape Server (VTS) uses the IBM Adstar Distributed Storage Manager (ADSM) as its engine to move data between the DASD and IBM 3590 tape drives on the VTS. In such a system, the VTS 100 uses the a storage manager client 140, e.g., the ADSM Hierarchical Storage Manager (HSM) client, and a distributed storage manager server 114 attached to the tape drives 118 to provide this function. A library manager 122, which may be a dual library manger according to the present invention, controls an accessor 142 which accesses individual tapes 144 via commands from the distributed storage manager server 114.

The distributed storage manager 112 is a client/server hierarchical storage manager 112 that may be used for a broad range of applications. As such, the distributed storage manager 112 often has a downlevel list of which files have a recent copy on one of the tapes 144. Further, the automatic storage manager administrator 126 is provided to link all the VTS code components and external links, e.g., to the library manager 122 and the tapes drives 118.

Figure 2:
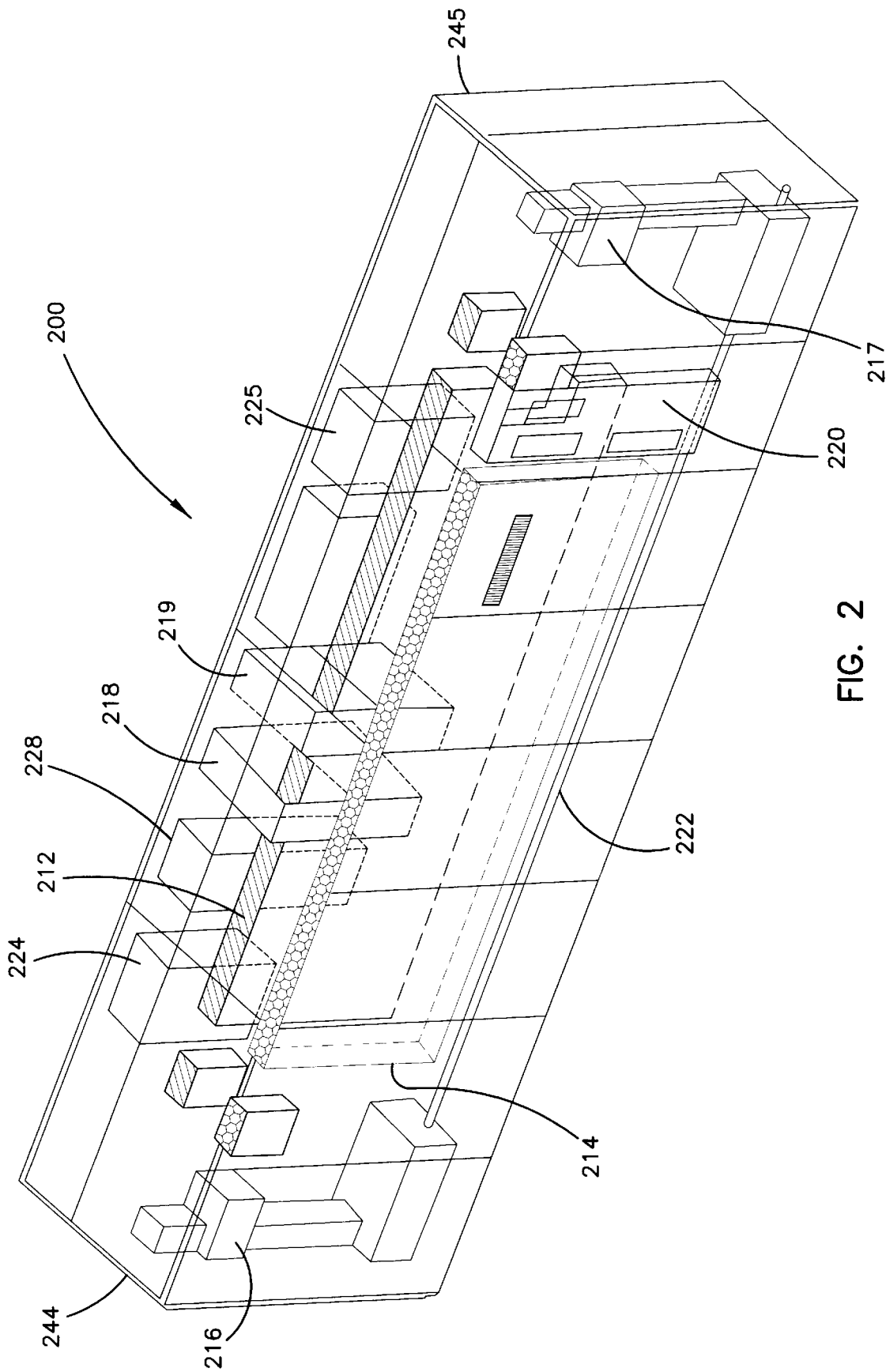
FIG. 2 illustrates an automated data storage library according to the present invention.

FIG. 2 illustrates an automated data storage library 200 having an inner "wall" of storage slots 212 and an outer wall of storage slots 214, which store data storage media. Typically, the data storage media are self-contained within a portable container, or cartridge. Examples of such data storage media include magnetic tape cartridges or cassettes, optical disk cartridges of various types, including ROM, WORM and rewritable, and in various formats. For universal reference to any of these types of media, the terms "data storage media" or "media" are used herein.

The library of the present invention is a multi-accessor library, the embodiment of the present invention illustrated in FIG. 2 having at least two accessors 216 and 217. An accessor is a robotic device which accesses the data storage media from the storage slots and delivers the accessed media to data storage drives 218 and 219 for reading and/or writing data on the accessed media and returns the media to storage slots 212 and 214. A media import/export port or station, 220 is provided for insertion or retrieval of data storage media into or out of the library. The accessors 216 and 217 run on a rail 222 in an aisle between the inner wall of storage slots 212 and the outer wall of storage slots 214.

In the illustrated embodiment, multiple library managers 224 and 225 are provided to manage the positioning and access of the accessors 216 and 217 to transport data storage media between storage slots 212 and 214, import/export port 220 and data storage drives 218 and 219.

An operator input station 228 is provided for allowing an operator to communicate with the automated data storage library. The accessors run on the rails 222 along the library aisle by motors (not shown). An example of an automated data storage library 200 is the IBM 3494 Data Storage Library, which stores magnetic tape cartridges.

Typically, the library manager 224 or 225 comprises a data processor and suitable data memory and data storage capability to control the operation of the library 200. Specifically, the library manager 224 or 225 controls the actions of the robot accessors 216 and 217. The conventional library manager 224 or 225 is interconnected through a provided interface to a host processor (not shown), which provides commands requesting access to particular data storage media or to media in particular storage slots, commands for access to data or to locations on the data storage media and information to be recorded on, or to be read from. Selected data storage media are typically transmitted directly between the drives 218, 219 and the host. The library manager 224 or 225 is typically provided with a database, which includes tables and programs. Examples of library managers 224 and 225 are an IBM personal computer or IBM RS/6000 processor.

Library manager 224 is associated with accessor 216 and library manager 225 is associated with accessor 217. The library manager 224 and associated accessor 216 may be located at one end of the library aisle and designated the "A" library manager and "A" accessor. Similarly, the library manager 225 and associated accessor 217 are at the opposite end of the library aisle and designated the "B" library manager and "B" accessor. The accessor 216 is called the "local" accessor with respect to library manager 224. The accessor 217 is called the "remote" accessor with respect to library manager 224. Similarly, accessor 217 is called the "local" accessor and accessor 216 is called the "remote" accessor with respect to library manager 225.

The present invention may be utilized with a single library manager, or with the illustrated multiple library managers. In accordance with the present invention, one of the accessors is designated as the "active" accessor. In one embodiment, only the active accessor has authorization to be in the aisle and handles all of the operations of the library. This sole authorization may also be called "full aisle mode". In a dual accessor library, in full aisle mode the accessor that is not servicing aisle requests, is the "standby" accessor. If the standby accessor is capable of performing the functions of an active accessor, it is considered to be available in "hot standby mode". If the standby accessor is not capable of performing the functions of an active accessor, it is considered to be "unavailable". In FIG. 2, the standby assessor is moved to the end of the library 244 or 245 and out of the aisle. The ends 244 and 245 of the library are called "service" or "standby" areas.

Figure 3:
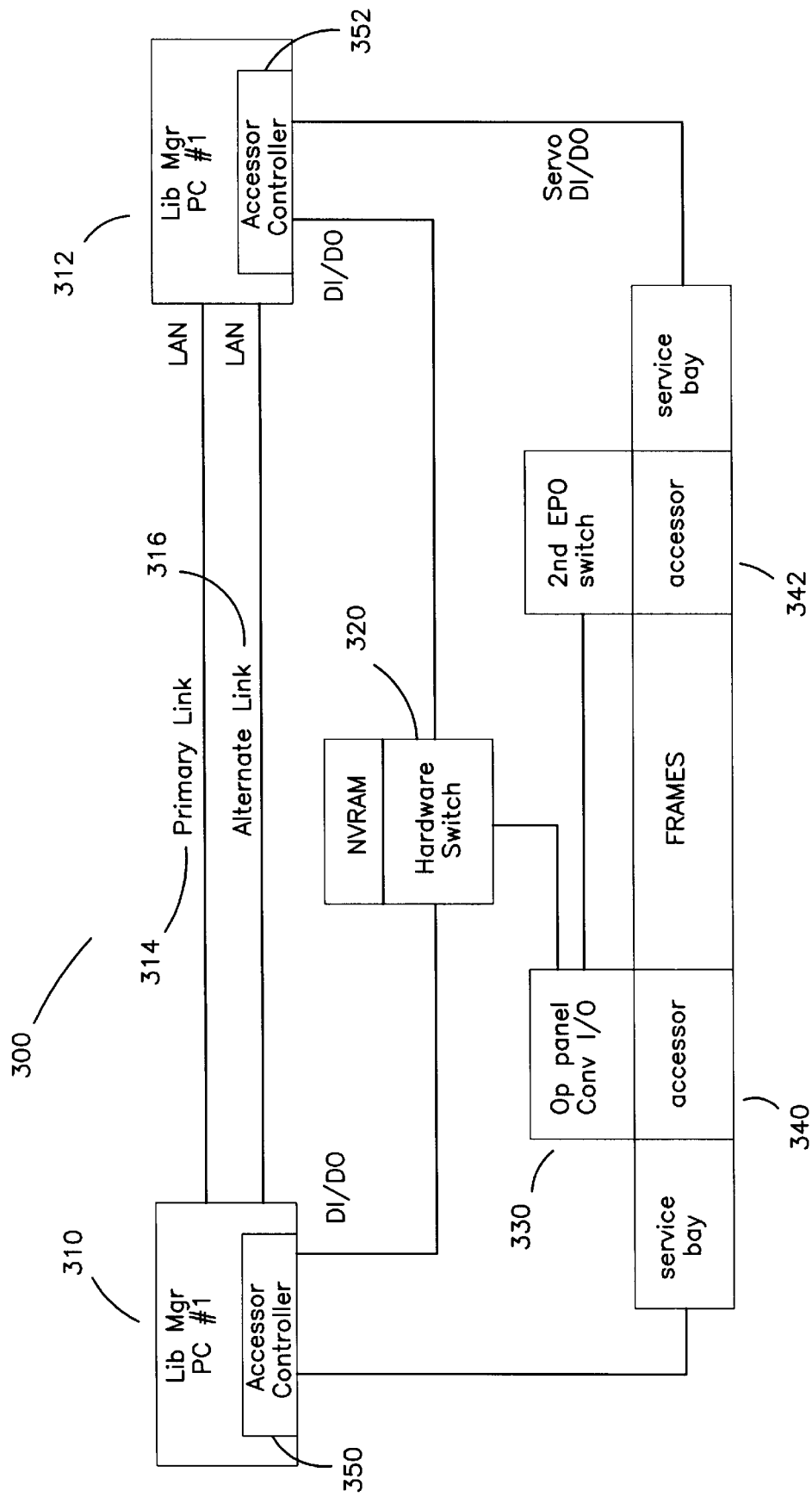
FIG. 3 illustrates a block diagram of a dual library manager/dual accessor system according to the present invention.

An automated tape library may be extended by adding dual library manager/dual accessor support. Thus, within each library manager controller, an accessor controller may be provided. FIG. 3 illustrates a block diagram 300 of a dual library manager/dual accessor system according to the present invention.

In FIG. 3, a first library manager 310 is connected to a second library manager 312 via a primary 314 and an alternate 316 link, such as through a Local Area Network (LAN). Each library manager 310, 312 is connected to a hardware switch 320 that allows either library manger 310, 312 to be connected to operator panel and convenience input/output station status lights, which will be hereinafter referred to as simply the operator interface 330. The operator interface 330 provides a status indication of the library system 300.

Each library manager 310, 312 is connected to an accessor 340, 342. As described above, the accessors 340, 342 transport data storage media throughout the library system 300. A first accessor controller 350 in the first library manager 310 keeps the operator interface 330 synchronized with the actual library state. Should a first accessor 340 fail, the switch 320 will connect the second accessor controller 352, which in turn will take control of the states of the operator interface 330.

To enable the switch and transfer of control to the second accessor controller 342, microcode (not shown) is provided to request control of the operator interface 330 and switchover completes. As will be described in greater detail below, the second accessor controller 352 must "fake" the station as being emptied. This is required to set an outboard, card resident, convenience input/output station state machine (not shown) in the library managers 310, 312 in the proper state. Additionally, the library manager 310, 312 that is active will communicate the actual state of the operator interface 330 to the second accessor controller 352 which will then set the proper states of the operator interface 330.

Figure 4:
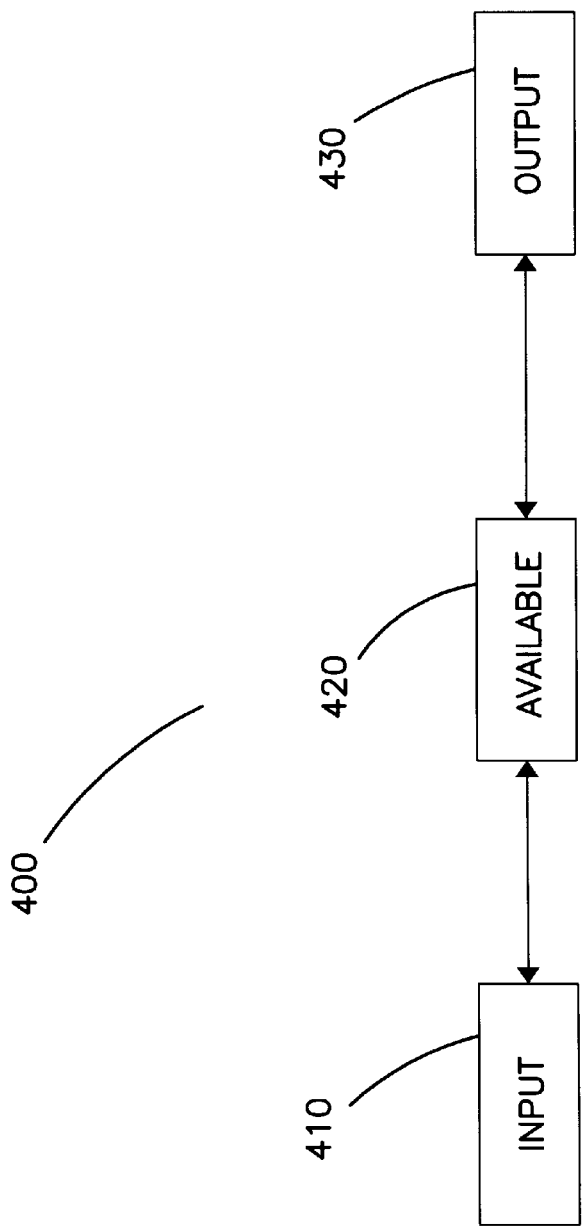
FIG. 4 is a state chart demonstrating the state of a station.

FIG. 4 is a state chart 400 demonstrating the state of a station. The station may be in an input state 410, available state 420 or in an output state 430. Transitions are allowed only between the input state 410 and the available state 420 or between the output state 430 and the available state 420.

If a station is in the available state 420, the station may move to an input state 410 where data storage media in the station may be inserted, the station locked and then the data storage media removed to the rack. Then the station transitions back to the available state 420. Similarly, a station may move from the available state 420 to an output state 430 where the station is empty and locked so that data storage media may be inserted from the rack. When the data storage media is removed, the station transitions back to the available state 420.

Nevertheless, a station may be empty and locked so that that the station is in an output state 430. The station may be unlocked so that data storage media may be removed. However, if a failure occurs at this point, the state will appear to be an input state 410 since the station is unlocked and occupied. Thus, the fake empty indication must be established so that the accessor controller believes that the station is available 420.

Figure 5:
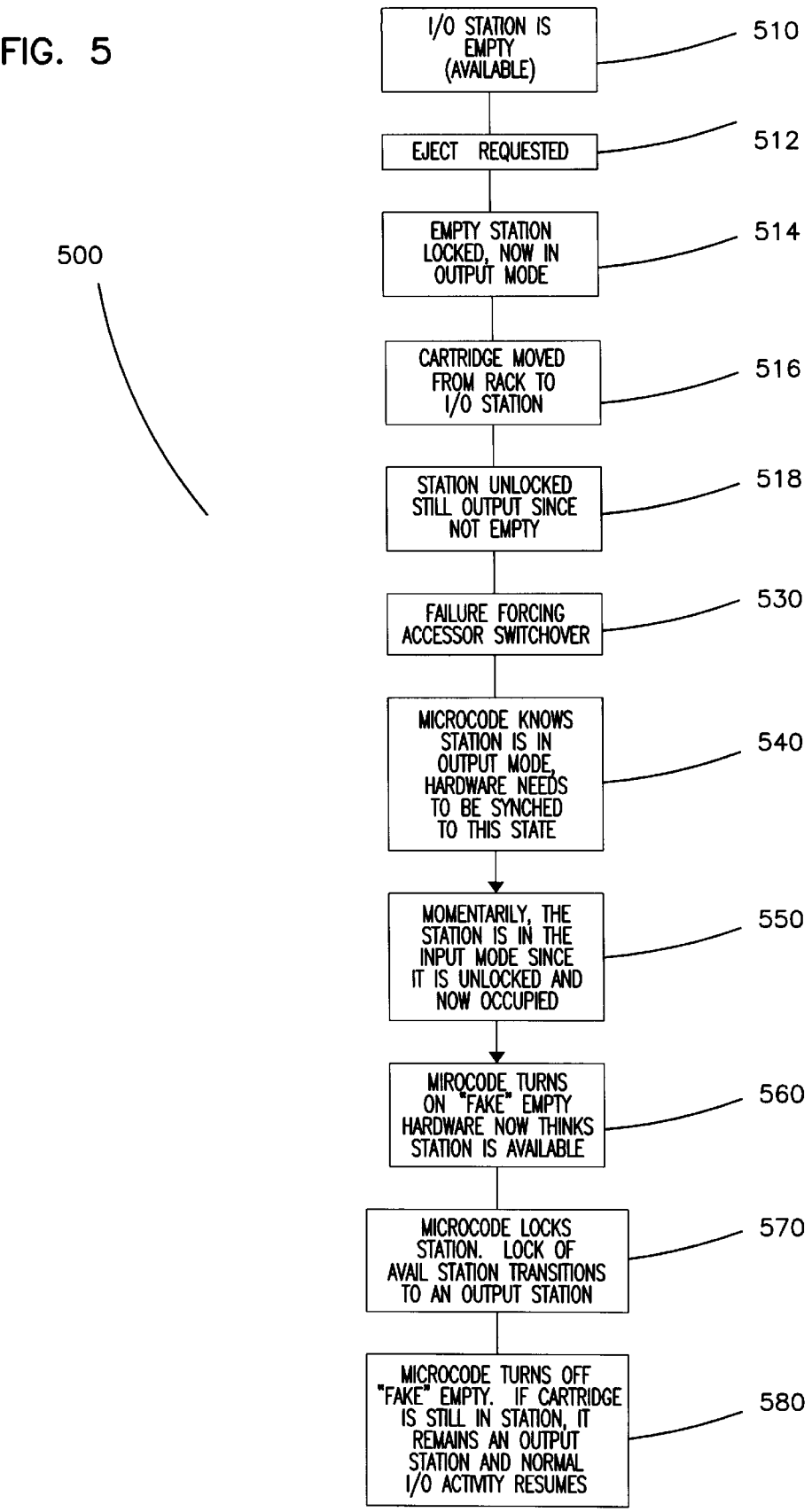
FIG. 5 illustrates a flow chart of the fake empty method for handling output stations on accessor switchovers in the event of a failure to one of the accessor controllers.

FIG. 5 illustrates a flow chart 500 of the fake empty method for handling output stations on accessor switchovers in the event of a failure to one of the accessor controllers. The system begins in an I/O station empty state 510, i.e., the available state. Then an eject command is made 512. The empty station is locked and placed in an output mode 514. Data storage media are moved from the rack to an I/O station 516 and the station unlocked is still in the output mode since the station is not empty 518. A failure may then occur thereby forcing accessor switchover 530. However, the microcode knows that the station is in the output mode, and that the hardware needs to be synchronized to this state 540. Thus, the station is momentarily placed in the input mode since it is unlocked and now occupied 550. The microcode then turns on the fake empty so that the hardware now thinks the station is available 560. The microcode then locks station transitions to an output state 570. Next, the microcode turns off the fake empty 580. If data storage media is still in the station, the station remains an output station and normal I/O activity resumes.

Figure 6:
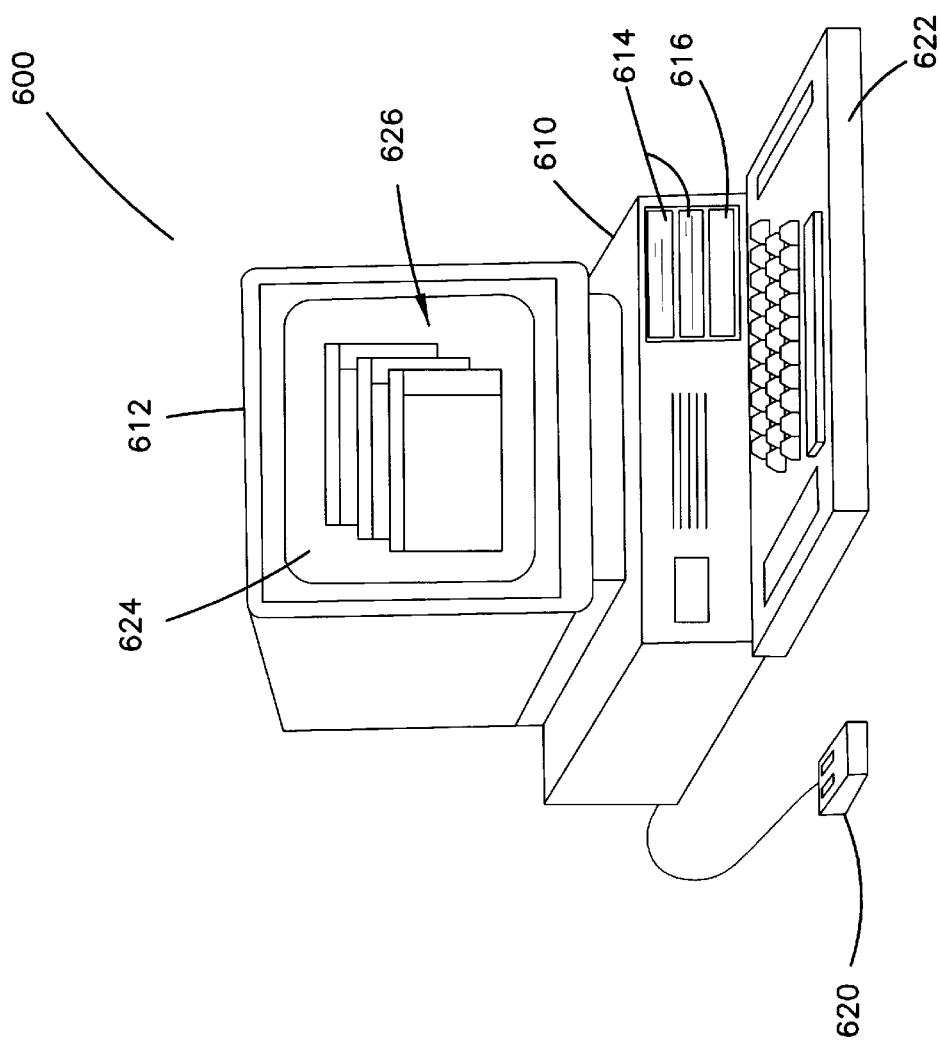
FIG. 6 is a block diagram illustrating an exemplary hardware environment for maintaining states of an operator panel and convenience input/output stations of a dual library manager/dual controller system.

FIG. 6 is a block diagram 600 that illustrates an exemplary hardware environment for maintaining states of an operator interface, such as an operator panel and/or convenience input/output stations, of a dual library manager/dual controller system according to the present invention. The present invention is typically implemented using a computer 610 comprised of a microprocessor, random access memory (RAM), read-only memory (ROM), and other components. It is envisioned that attached to the computer 610 may be a monitor 612, floppy disk drives 614, and CD-ROM drives 616. Also included in the preferred embodiment may be input devices, for example, a mouse pointing device 620 and a keyboard 622.

The computer 610 operates under the control of an operating system 624, such as the Windows, OS/2, Macintosh, or UNIX operating systems, which is represented in FIG. 6 by the screen display on the monitor 612. The computer 610 executes one or more computer programs 626, which are represented in FIG. 6 by the "windows" displayed on the monitor 612, under the control of the operating system 624. The present invention comprises a library manager that is preferably implemented in the operating system 624 and/or computer programs 626.

Generally, the operating system 624 and the computer programs 626 may be tangibly embodied in a computer-readable medium or carrier, e.g. one or more of the fixed and/or removable data storage devices 614 and 616, or other data storage or data communications devices. Both the operating system 624 and the computer programs 626 may be loaded from the data storage devices 614 and 616 into the random access memory of the computer 610 for execution by the microprocessor as discussed above with reference to FIG. 5. Both the operating system 624 and the computer programs 626 comprise instructions which, when read and executed by the microprocessor of the computer 610, causes the computer 610 to perform the steps necessary to execute the steps or elements of the present invention.

Although an exemplary computer system configuration is illustrated in FIG. 6, those skilled in the art will recognize that any number of different configurations performing similar functions may be used to allow control of an operator interface by more than one controller without reinitializing at a default condition.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of for maintaining states of an operator interface of a dual library manager/dual accessor controller system in the event of a failure to one accessor, the method comprising the steps of:

detecting a failure of the first accessor during an operation;

exhibiting an incorrect state by the operator interface for a station in response to the failure of the first accessor;

switching control to a second accessor controller; and establishing a correct state indication for the operator interface via the second accessor controller.

2. The method of claim 1 wherein the step of detecting a failure further comprises the steps of:

locking an input/output station;

moving the data storage media to the station using a first accessor;

unlocking the station; and detecting the failure of the first accessor.

3. The method of claim 1 wherein the step of establishing a correct state for the operator interface further comprises the steps of establishing a fake empty status for a station and locking the station.

4. The method of claim 1 wherein the step of detecting the failure further comprises the step of exhibiting an input state for the operator interface.

5. The method of claim 4 wherein the step of establishing a correct state for the operator interface further comprises the steps of establishing a fake empty status for a station after the failure of the first accessor to cause the station to exhibit an available state.

6. The method of claim 1 wherein the step of detecting the failure further comprises the steps of monitoring the status of the station and recognizing the correct state of the station when the failure occurs.

7. The method of claim 6 wherein the step of establishing a correct state for the operator interface further comprises the steps of establishing a fake empty status for a station after the failure of the first accessor and locking the station to bring the station to the correct state.

8. A library manager system, comprising:

an operator interface for displaying a status indication of a library system;

a first accessor controller, operatively coupled to the operator interface, for controlling a first accessor for moving data storage media between storage slots, input/output stations, and data storage drives;

a second accessor controller, operatively coupled to the operator interface, for controlling a second accessor for moving data storage media between storage slots, input/output stations, and data storage drives;

at least one library manager, operatively coupled to the first and second accessor controllers, for controlling the first and second accessor controllers, the at least one library manager detecting a failure of the first accessor during an operation and switching control to the second accessor controller, the failure causing the operator interface to exhibit an incorrect state for a station, the second accessor controller taking control of the status indication of the library system by establishing a correct state indication at the operator interface for the station.

9. The library manager system of claim 8 wherein the failure occurs after data storage media is moved to the station and the station is unlocked.

10. The library manager system of claim 9 wherein the second accessor controller establishes a fake empty status after the failure of the first accessor and locks the station.

11. The library manager system of claim 9 wherein the failure causes the station to exhibit an input state.

12. The library manager system of claim 11 wherein the second accessor controller establishes a fake empty status for the station after the failure of the first accessor to cause the station to exhibit an available state.

13. The library manager system of claim 8 wherein the second accessor controller further comprises microcode for monitoring the status of a station, the microcode recognizing the correct state of the station.

14. The library manager system of claim 13 wherein the microcode establishing a fake empty status after the failure of the first accessor and locking the station to bring the station to the correct state.

15. An article of manufacture for a computer-based user-interface, the article of manufacture comprising a computer readable medium having instructions for causing a computer to perform automated reconcile of a server and client database in a virtual tape server, the method comprising the steps of:

detecting a failure of the first accessor during an operation;

exhibiting an incorrect state by the operator interface for a station in response to the failure of the first accessor;

switching control to a second accessor controller; and establishing a correct state indication for the operator interface via the second accessor controller.

16. The article of manufacture of claim 15 wherein the step of detecting a failure further comprises the steps of:

locking an input/output station;

moving the data storage media to the station using a first accessor;

unlocking the station; and detecting the failure of the first accessor.

17. The article of manufacture of claim 15 wherein the step of establishing a correct state for the operator interface further comprises the steps of establishing a fake empty status for a station and locking the station.

18. The article of manufacture of claim 15 wherein the step of detecting the failure further comprises the step of exhibiting an input state for a station.

19. The article of manufacture of claim 18 wherein the step of establishing a correct state for the operator interface further comprises the steps of establishes a fake empty status for the station after the failure of the first accessor to cause the station to exhibit an available state.

20. The article of manufacture of claim 15 wherein the step of detecting the failure further comprises the steps of monitoring the status of a station and recognizing the correct state of the station when the failure occurs.

21. The article of manufacture of claim 20 wherein the step of establishing a correct state for the operator interface further comprises the steps of establishing a fake empty status of a station after the failure of the first accessor and locking the station to bring the station to the correct state.

\* \* \* \* \*